(12) United States Patent
Tibbling et al.

(10) Patent No.: US 12,730,510 B2
(45) Date of Patent: Sep. 8, 2026

(54) METHOD, SYSTEM, AND COMPUTER PROGRAM PRODUCT FOR DRAWING AND FINE-TUNED MOTOR CONTROLS

(71) Applicant: Tobii Dynavox AB, Stockholm (SE)

(72) Inventors: Björn Tibbling, Järfälla (SE); Simon Cicek, Örebro (SE); Erik Joel Ahlgren, Visby (SE); Emil Lennart Johannes Eriksson Wallin, Farsta (SE); Gordan Gubic, Stockholm (SE); Volodymyr Iakovenko, Stockholm (SE)

(73) Assignee: Tobii Dynavox AB, Stockholm (SE)

( * ) Notice: Subject to any disclaimer, the term of this patent is extended or adjusted under 35 U.S.C. 154(b) by 0 days.

(21) Appl. No.: 19/001,002

(22) Filed: Dec. 24, 2024

(65) Prior Publication Data

US 2025/0130637 A1 Apr. 24, 2025

Related U.S. Application Data

(63) Continuation of application No. 18/372,789, filed on Sep. 26, 2023, now Pat. No. 12,204,689.

(Continued)

(51) Int. Cl.
*G06F 3/04812* (2022.01)
*G06F 3/01* (2006.01)

(52) U.S. Cl.
CPC .......... *G06F 3/013* (2013.01); *G06F 3/04812* (2013.01)

(58) Field of Classification Search
CPC .. G06F 3/013; G06F 3/04812; G06F 3/04817; G06F 3/04842
See application file for complete search history.

(56) References Cited

U.S. PATENT DOCUMENTS 6,637,883 B1 * 10/2003 Tengshe ................. G06V 40/19 351/210
7,561,143 B1 * 7/2009 Milekic .................. G06F 3/013 345/32

(Continued)

FOREIGN PATENT DOCUMENTS

CN 111949131 B 4/2023
WO 2008066460 A1 6/2008
WO 2022101451 A2 5/2022

OTHER PUBLICATIONS

Huang et al., "Eyes can draw: A high-fidelity free-eye drawing method with unimodal gaze control", International Journal of Human-Computer Studies, 2023, pp. 1-21, vol. 170:102966.

(Continued)

*Primary Examiner* — Jeff Piziali
(74) *Attorney, Agent, or Firm* — The Webb Law Firm

(57) ABSTRACT

A method, system, and computer program product is provided for drawing and fine-tuned motor controls. The method may include displaying data comprising an activation zone via a display of a user device; receiving gaze data from a user comprising a gaze point; and determining a location of the gaze point is within the activation zone. Additionally, the method may include moving a cursor in a direction of the gaze point based on determining the location of the gaze point is within the activation zone, where moving the cursor causes an action. Data associated with the action may be displayed via the display of the user device.

11 Claims, 12 Drawing Sheets

400

Related U.S. Application Data

(60) Provisional application No. 63/410,382, filed on Sep. 27, 2022.

(56) References Cited

U.S. PATENT DOCUMENTS 8,913,004 B1* 12/2014 Bozarth ................ G06F 1/3234 348/78
9,442,566 B2 9/2016 Eskilsson et al.
9,626,072 B2 4/2017 Feit et al.
9,823,745 B1* 11/2017 Fateh .................... G06T 11/206
9,971,401 B2 5/2018 Stafford
10,133,945 B2 11/2018 Sezgin et al.
10,345,898 B2 7/2019 Chen et al.
10,394,019 B2 8/2019 Ryan et al.
10,534,982 B2 1/2020 Linden
10,564,714 B2 2/2020 Marggraff et al.
10,678,897 B2 6/2020 Skogo et al.
10,936,063 B2 3/2021 Thunstrom et al.
10,996,751 B2 5/2021 Mohlin et al.
11,054,903 B2 7/2021 Andersson
11,061,471 B2 7/2021 Linden
11,061,473 B2 7/2021 Ryan et al.
11,231,777 B2 1/2022 Lee et al.
11,249,547 B2 2/2022 Wang et al.
11,308,321 B2 4/2022 Masko et al.
2008/0074389 A1* 3/2008 Beale ...................... G06F 3/013 345/157
2009/0125849 A1* 5/2009 Bouvin ................... G06F 3/013 715/863
2012/0287040 A1* 11/2012 Moore ................... G02B 27/01 345/157
2014/0085204 A1* 3/2014 Jahnke .................... G06F 3/013 345/158
2014/0247232 A1* 9/2014 George-Svahn ........ G06F 3/012 345/184
2014/0359521 A1* 12/2014 Lin ..................... G06F 3/04842 715/810
2015/0091793 A1* 4/2015 Lee ....................... G06F 3/0485 345/158
2016/0048223 A1* 2/2016 Taguchi ................ G06F 3/0346 345/157
2016/0246384 A1* 8/2016 Mullins ................... G06F 3/017
2016/0313804 A1* 10/2016 Neisler ................... G06F 3/017
2016/0314562 A1* 10/2016 Sakamoto ............... G06F 3/011
2016/0357255 A1 12/2016 Lindh et al.
2017/0139556 A1* 5/2017 Josephson ........... H04L 12/2803
2017/0140224 A1* 5/2017 Wilson ................... H04N 23/20
2017/0285737 A1* 10/2017 Khalid .................... G06F 3/013
2017/0318019 A1* 11/2017 Gordon .................. G06V 40/67
2018/0275753 A1* 9/2018 Publicover .......... G06F 3/04812
2019/0033964 A1* 1/2019 Kulkarni ............. G06F 3/04842
2019/0033966 A1* 1/2019 Odagiri .................. G09G 5/377
2019/0318708 A1* 10/2019 Tall ........................ G06F 3/147
2019/0354171 A1* 11/2019 Dai ......................... G06F 3/013
2020/0022577 A1* 1/2020 Rishoni .................. A61B 3/113
2020/0134867 A1 4/2020 Zachrisson et al.
2020/0257358 A1 8/2020 Rosell et al.
2021/0089121 A1 3/2021 Ronngren
2021/0255698 A1 8/2021 Rana et al.
2021/0256715 A1 8/2021 Ryan et al.
2021/0278678 A1* 9/2021 Brannan ................... G06T 3/40
2021/0287443 A1 9/2021 Pateriya
2021/0350565 A1 11/2021 Fogelstrom et al.
2021/0405760 A1* 12/2021 Schoen ................. G06F 1/1686
2022/0043509 A1 2/2022 Dahl et al.
2022/0129080 A1* 4/2022 Yasuda .............. G02B 27/0093
2022/0229524 A1* 7/2022 McKenzie .......... G06F 3/04886
2022/0283637 A1* 9/2022 Watanabe ............ H04N 23/633
2023/0071037 A1* 3/2023 Kim .................... G06F 3/04886
2023/0328357 A1* 10/2023 Ogawa ................. H04N 23/667 396/51
2024/0028110 A1* 1/2024 Aurongzeb ........... G06F 3/0481

OTHER PUBLICATIONS

Huang et al., "Improving and Analyzing Sketchy High-Fidelity Free-Eye Drawing," Designing Interactive Systems Conference, Jul. 2023, pp. 856-870.

Porta et al., "ceCursor, a Contextual Eye Cursor for General Pointing in Windows Environments", Proceedings of the 27th Annual International Conference on Mobile Computing and Networking, Association for Computing Machinery, Inc., Mar. 2010, pp. 331-337.

Yeo et al., "Gaze Estimation Model for Eye Drawing", CHI, ACM/IEEE Design Automation Conference, Apr. 2006, pp. 1559-1564.

* cited by examiner

METHOD, SYSTEM, AND COMPUTER PROGRAM PRODUCT FOR DRAWING AND FINE-TUNED MOTOR CONTROLS

CROSS-REFERENCE TO RELATED APPLICATION

This application claims priority to U.S. patent application Ser. No. 18/372,789, filed on Sep. 26, 2023, which claims priority to U.S. Provisional Patent Application No. 63/410,382, filed on Sep. 27, 2022, the disclosures of which are incorporated by reference herein in their entireties.

BACKGROUND

Field of the Invention

This disclosure relates generally to drawing and fine-tuned motor controls and, in non-limiting embodiments, systems, methods, and computer program products for drawing and fine-tuned motor controls.

Discussion of the Related Art

Using eye tracking technology (e.g., software, hardware, etc.), users are able to interact with computing devices (e.g., desk tops, laptops, tablets, smart phones, smart watches, etc.) using eye movements. For example, users may use eye movements to control the direction of a cursor and/or select an icon and/or selectable button by changing the direction of their eye gaze, pausing eye movements, and/or staring (e.g., allowing their eye gaze to dwell). In some cases, gaze data (e.g., eye image data) is captured and processed to track a user's eye movements.

However, using eye tracking technology, it may be difficult for users to control the speed and/or precision of their eye movements and/or cursor movements. Sudden and/or unavoidable eye movements may cause unintended results. For example, using eye tracking technology, it may be difficult for a user to draw an image because sudden and/or unavoidable eye movements may damage the image by causing undesired lines to appear.

SUMMARY

According to some non-limiting embodiments, provided is a method for drawing and fine-tuned motor controls. In some non-limiting embodiments, the method may include displaying, with at least one processor, data comprising an activation zone via a display of a user device. In some non-limiting embodiments, the method may include receiving, with at least one processor, gaze data from a user comprising a gaze point. In some non-limiting embodiments, the method may include determining, with at least one processor, a location of the gaze point is within the activation zone. In some non-limiting embodiments, the method may include moving, with at least one processor, a cursor in a direction of the gaze point based on determining the location of the gaze point is within the activation zone. In some non-limiting embodiments, the method may include in response to moving the cursor in a direction of the gaze point, causing, with at least one processor, an action to be performed. In some non-limiting embodiments, the method may include displaying, with at least one processor, data associated with the action via the display of the user device.

In some non-limiting embodiments, determining the location of the gaze point is within the activation zone may include: determining a time the location of the gaze point is within the activation zone satisfies a threshold value; and determining the location of the gaze point is within the activation zone based on determining the time the location of the gaze point is within the activation zone satisfies the threshold value.

In some non-limiting embodiments, moving the cursor in the direction of the gaze point may include: determining a location of the cursor; determining a distance between the location of the gaze point and the location of the cursor; and moving the cursor in the direction of the gaze point at a speed, the speed of a cursor movement is based on the distance between the location of the gaze point and the location of the cursor.

In some non-limiting embodiments, the method may further include stopping movement of the cursor when the location of the gaze point is not within the activation zone, wherein stopping movement of the cursor causes the action to end.

In some non-limiting embodiments, the activation zone may include an annulus between two concentric circles.

In some non-limiting embodiments, an outer edge of the activation zone may include an icon, and the method may further include: receiving a selection of the icon by the user; and stopping movement of the cursor, wherein stopping movement of the cursor causes the action to end.

In some non-limiting embodiments, a size of the activation zone may be based on a percentage of a width of a display of the user device.

According to some non-limiting embodiments, provided is a system for drawing and fine-tuned motor controls. In some non-limiting embodiments, the system may include at least one processor programmed or configured to display data comprising an activation zone via a display of a user device. In some non-limiting embodiments, the at least one processor may be programmed or configured to receive gaze data from a user comprising a gaze point. In some non-limiting embodiments, the at least one processor may be programmed or configured to determine a location of the gaze point is within the activation zone. In some non-limiting embodiments, the at least one processor may be programmed or configured to move a cursor in a direction of the gaze point based on determining the location of the gaze point is within the activation zone. In some non-limiting embodiments, the at least one processor may be programmed or configured to in response to moving the cursor in a direction of the gaze point, cause an action to be performed. In some non-limiting embodiments, the at least one processor may be programmed or configured to display data associated with the action via the display of the user device.

In some non-limiting embodiments, when determining the location of the gaze point is within the activation zone, the at least one processor may be programmed or configured to: determine a time the location of the gaze point is within the activation zone satisfies a threshold value; and determine the location of the gaze point is within the activation zone based on determining the time the location of the gaze point is within the activation zone satisfies the threshold value.

In some non-limiting embodiments, wherein, when moving the cursor in the direction of the gaze point, the at least one processor may be programmed or configured to: determine a location of the cursor; determine a distance between the location of the gaze point and the location of the cursor; and move the cursor in the direction of the gaze point at a speed, the speed of a cursor movement is based on the distance between the location of the gaze point and the location of the cursor.

In some non-limiting embodiments, the at least one processor may be further programmed or configured to: stop movement of the cursor when the location of the gaze point is not within the activation zone, wherein stopping movement of the cursor may cause the action to end.

In some non-limiting embodiments, the activation zone may include an annulus between two concentric circles.

In some non-limiting embodiments, an outer edge of the activation zone may include an icon, and the at least one processor may be further programmed or configured to: receive a selection of the icon by the user; and stop movement of the cursor, wherein stopping movement of the cursor may cause the action to end.

In some non-limiting embodiments, a size of the activation zone may be based on a percentage of a width of a display of the user device.

According to some non-limiting embodiments, provided is a computer program product for drawing and fine-tuned motor controls. In some non-limiting embodiments, the computer program product may include at least one non-transitory computer-readable medium including one or more instructions that, when executed by at least one processor, cause the at least one processor to: display data comprising an activation zone via a display of a user device; receive gaze data from a user comprising a gaze point; determine a location of the gaze point is within the activation zone. In some non-limiting embodiments, the instructions may cause the at least one processor to move a cursor in a direction of the gaze point based on determining the location of the gaze point is within the activation zone. In some non-limiting embodiments, the instructions may cause the at least one processor to in response to moving the cursor in a direction of the gaze point, cause an action to be performed. In some non-limiting embodiments, the instructions may cause the at least one processor to display data associated with the action via the display of the user device.

In some non-limiting embodiments, when determining the location of the gaze point is within the activation zone, the instructions may cause the at least one processor to: determine a time the location of the gaze point is within the activation zone satisfies a threshold value; and determine the location of the gaze point is within the activation zone based on determining the time the location of the gaze point is within the activation zone satisfies the threshold value.

In some non-limiting embodiments, when moving the cursor in the direction of the gaze point, the instructions may cause the at least one processor to: determine a location of the cursor; determine a distance between the location of the gaze point and the location of the cursor; and move the cursor in the direction of the gaze point at a speed, the speed of a cursor movement may be based on the distance between the location of the gaze point and the location of the cursor.

In some non-limiting embodiments, the instructions may further cause the at least one processor to: stop movement of the cursor when the location of the gaze point is not within the activation zone, wherein stopping movement of the cursor may cause the action to end.

In some non-limiting embodiments, the activation zone may include an annulus between two concentric circles.

In some non-limiting embodiments, an outer edge of the activation zone may include an icon, and the instructions may further cause the at least one processor to: receive a selection of the icon by the user; and stop movement of the cursor, wherein stopping movement of the cursor may cause the action to end.

In some non-limiting embodiments, a size of the activation zone may be based on a percentage of a width of a display of the user device.

Other non-limiting embodiments or aspects will be set forth in the following numbered clauses:

Clause 1: A method for drawing and fine-tuned motor controls comprising: displaying, with at least one processor, data comprising an activation zone via a display of a user device; receiving, with at least one processor, gaze data from a user comprising a gaze point; determining, with at least one processor, a location of the gaze point is within the activation zone; moving, with at least one processor, a cursor in a direction of the gaze point based on determining the location of the gaze point is within the activation zone; in response to moving the cursor in a direction of the gaze point, causing, with at least one processor, an action to be performed; and displaying, with at least one processor, data associated with the action via the display of the user device.

Clause 2: The method of clause 1, wherein determining the location of the gaze point is within the activation zone comprises: determining a time the location of the gaze point is within the activation zone satisfies a threshold value; and determining the location of the gaze point is within the activation zone based on determining the time the location of the gaze point is within the activation zone satisfies the threshold value.

Clause 3: The method of clause 1 or clause 2, wherein moving the cursor in the direction of the gaze point comprises: determining a location of the cursor; determining a distance between the location of the gaze point and the location of the cursor; and moving the cursor in the direction of the gaze point at a speed, wherein the speed of a cursor movement is based on the distance between the location of the gaze point and the location of the cursor.

Clause 4: The method of any of clauses 1-3, further comprising: stopping movement of the cursor when the location of the gaze point is not within the activation zone, wherein stopping movement of the cursor causes the action to end.

Clause 5: The method of any of clauses 1-4, wherein the activation zone comprises an annulus between two concentric circles.

Clause 6: The method of any of clauses 1-5, wherein an outer edge of the activation zone comprises an icon, the method further comprising: receiving a selection of the icon by the user; and stopping movement of the cursor, wherein stopping movement of the cursor causes the action to end.

Clause 7: The method of any of clauses 1-6, wherein a size of the activation zone is based on a percentage of a width of a display of the user device.

Clause 8: A system for drawing and fine-tuned motor controls comprising: at least one processor, the at least one processor programmed or configured to: display data comprising an activation zone via a display of a user device; receive gaze data from a user comprising a gaze point; determine a location of the gaze point is within the activation zone; move a cursor in a direction of the gaze point based on determining the location of the gaze point is within the activation zone; in response to moving the cursor in a direction of the gaze point, cause an action to be performed; and display data associated with the action via the display of the user device.

Clause 9: The system of clause 8, wherein, when determining the location of the gaze point is within the activation zone, the at least one processor is programmed or configured to: determine a time the location of the gaze point is within the activation zone satisfies a threshold value; and determine the location of the gaze point is within the activation zone based on determining the time the location of the gaze point is within the activation zone satisfies the threshold value.

Clause 10: The system of clause 8 or clause 9, wherein, when moving the cursor in the direction of the gaze point, the at least one processor is programmed or configured to: determine a location of the cursor; determine a distance between the location of the gaze point and the location of the cursor; and move the cursor in the direction of the gaze point at a speed, wherein the speed of a cursor movement is based on the distance between the location of the gaze point and the location of the cursor.

Clause 11: The system of any of clauses 8-10, wherein the at least one processor is further programmed or configured to: stop movement of the cursor when the location of the gaze point is not within the activation zone, wherein stopping movement of the cursor causes the action to end.

Clause 12: The system of any of clauses 8-11, wherein the activation zone comprises an annulus between two concentric circles.

Clause 13: The system of any of clauses 8-12, wherein an outer edge of the activation zone comprises an icon, and wherein the at least one processor is further programmed or configured to: receive a selection of the icon by the user; and stop movement of the cursor, wherein stopping movement of the cursor causes the action to end.

Clause 14: The system of any of clauses 8-13, wherein a size of the activation zone is based on a percentage of a width of a display of the user device.

Clause 15: A computer program product for drawing and fine-tuned motor controls comprising at least one non-transitory computer-readable medium including one or more instructions that, when executed by at least one processor, cause the at least one processor to: display data comprising an activation zone via a display of a user device; receive gaze data from a user comprising a gaze point; determine a location of the gaze point is within the activation zone; move a cursor in a direction of the gaze point based on determining the location of the gaze point is within the activation zone; in response to moving the cursor in a direction of the gaze point, cause an action to be performed; and display data associated with the action via the display of the user device.

Clause 16: The computer program product of clause 15, wherein, when determining the location of the gaze point is within the activation zone, the instructions cause the at least one processor to: determine a time the location of the gaze point is within the activation zone satisfies a threshold value; and determine the location of the gaze point is within the activation zone based on determining the time the location of the gaze point is within the activation zone satisfies the threshold value.

Clause 17: The computer program product of clause 15 or clause 16, wherein, when moving the cursor in the direction of the gaze point, the instructions cause the at least one processor to: determine a location of the cursor; determine a distance between the location of the gaze point and the location of the cursor; and move the cursor in the direction of the gaze point at a speed, wherein the speed of a cursor movement is based on the distance between the location of the gaze point and the location of the cursor.

Clause 18: The computer program product of any of clauses 15-17, wherein the instructions further cause the at least one processor to: stop movement of the cursor when the location of the gaze point is not within the activation zone, wherein stopping movement of the cursor causes the action to end.

Clause 19: The computer program product of any of clauses 15-18, wherein the activation zone comprises an annulus between two concentric circles.

Clause 20: The computer program product of any of clauses 15-19, wherein an outer edge of the activation zone comprises an icon, and wherein the instructions further cause the at least one processor to: receive a selection of the icon by the user; and stop movement of the cursor, wherein stopping movement of the cursor causes the action to end.

Clause 21: The computer program of any of clauses 15-20, wherein a size of the activation zone is based on a percentage of a width of a display of the user device.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

Additional advantages and details are explained in greater detail below with reference to the non-limiting, exemplary embodiments that are illustrated in the accompanying schematic figures, in which.

DESCRIPTION OF THE PREFERRED EMBODIMENTS

Figure 1:
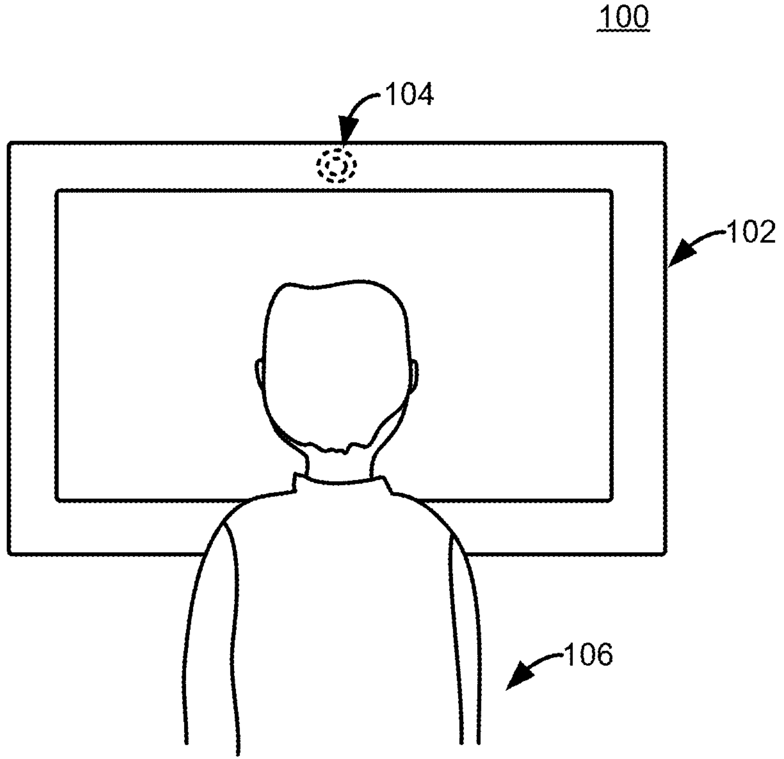
FIG. 1 is a schematic diagram of a system for drawing and fine-tuned motor controls according to a non-limiting embodiment.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "communication" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

As used herein, the term "user device" may refer to one or more electronic devices configured to process data. A user device may, in some examples, include the necessary components to receive, process, and output data, such as a processor, a display, a memory, an input device, a network interface, and/or the like. A user device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A user device may also be a desktop computer or other form of non-mobile computer.

As used herein, the term "eye tracking device" may refer to one or more electronic devices configured to receive, capture, and/or process data (e.g., gaze data). An eye tracking device may, in some examples, may include a camera, image sensor(s) (e.g., complementary metal oxide semiconductor (CMOS) sensors, charged coupled device (CCD) sensors, and/or the like), and/or lights. An eye tracking device, in some examples, may be part of (e.g., integrated into) a user device. Alternatively, an eye tracking device may be an accessory for a user device.

Provided are methods, systems, and computer program products for drawing and fine-tuned motor controls. Non-limiting embodiments of the present disclosure may include a method comprising displaying data comprising an eye tracking zone via a display of a user device. In some non-limiting embodiments, the eye tracking zone may comprise an activation zone. For example, a user device may include a display (e.g., a screen) which displays an eye tracking zone, including an activation zone. In some non-limiting embodiments, the method may include receiving, gaze data from a user. For example, the gaze data may include a gaze point. In some non-limiting embodiments, the method may include determining whether a location of the gaze point is within the activation zone. In some non-limiting embodiments, the method may include moving a cursor in a direction of the gaze point. For example, the method may include moving the cursor in a direction of the gaze point based on determining the location of the gaze point is within the activation zone. In some non-limiting embodiments, the method may include, in response to moving the cursor in a direction of the gaze point, causing an action to be performed. For example, moving a cursor may cause a line to be drawn. In some non-limiting embodiments, the method may include displaying data associated with the action via the display of the user device. For example, moving the cursor may cause a line to be drawn and displayed on the display of the user device. In some non-limiting embodiments, determining whether the location of the gaze point is within the activation zone may comprise determining a time (e.g., in seconds, milliseconds, etc.) the location of the gaze point is within the activation zone exceeds a threshold value (e.g., 0 seconds to 1 second). In some non-limiting embodiments, moving the cursor in the direction of the gaze point may comprise: determining a location of the cursor; determining a distance between the location of the gaze point and the location of the cursor; and moving the cursor in the direction of the gaze point at a speed. The speed of the cursor movement may be based on the distance between the location of the gaze point and the first location of the cursor. For example, as the distance between the location of the gaze point and the first location of the cursor increases and/or decreases, the speed of the cursor movement may increase and/or decrease. In some non-limiting embodiments, the method may further comprise stopping movement of the cursor when the location of the gaze point is not within the activation zone. For example, when the location of the gaze point is not within the activation zone, the movement of the cursor may stop, causing the action being performed to end. In some non-limiting embodiments, the activation zone may comprise an annulus between two concentric circles. In some non-limiting embodiments, an outer edge of the activation zone may comprise an icon (e.g., a selection button). The method may further comprise receiving a selection of the icon by the user; and stopping movement of the cursor, wherein stopping movement of the cursor causes the action to end. For example, an outer edge of the activation zone may include an "END" icon, which may be selected by the user to end an action (e.g., drawing). In some non-limiting embodiments, a size of the activation zone may be based on a percentage of a width of the display (e.g., a screen) of the user device.

In this way, the non-limiting embodiments of the present disclosure enables users to interact with user devices based on eye movements. Additionally, non-limiting embodiments enable users to perform actions (e.g., drawing, scrubbing videos, editing images, etc.) that require control of the speed and/or precision of cursor movements. For example, some non-limiting embodiments allow a user to draw only within the activation zone displayed on the user device so that if the user moves their eyes away from the gaze point and outside of the activation zone, the drawing will stop. This may be advantageous to users who are attempting to draw an image on a user device that receives pop-up notifications. If a notification appears on the display of the user device, the users gaze point may quickly and/or unintentionally move in the direction of the notification. If the pop-up is outside of the activation zone, the drawing action will stop when the location of the gaze point exits the activation zone instead of creating unintended markings on the image as a result of the unintentional eye movements.

FIG. 1 is a diagram of a system for drawing and fine-tuned controls according to some non-limiting embodiments. As shown in FIG. 1, system 100 may include user device 102, eye tracking device 104, and/or user 106.

In some non-limiting embodiments, user device 102 may include one or more user devices capable of communicating information to and/or receiving information from eye tracking device 104 and/or user 106. For example, user device 102 may be a personal computer (e.g., desktop, laptop, tablet, smart phone, etc.) that communicates information to and/or receives input from eye tracking device 104 and/or user 106. In some non-limiting embodiments, user device 102 may include a display. For example, user device 102 may include one or more displays (screens, monitors, etc.) to display data to user 106 via a graphical user interface (GUI) on the display.

In some non-limiting embodiments, the GUI may be an interactive GUI. For example, the GUI may be configured to receive input data from eye tracking device 104 and/or user 106. In some non-limiting embodiments, data displayed via the interactive GUI (e.g., buttons, icons, drop down menus, and/or the like) may be updated based on receiving the input data.

In some non-limiting embodiments, user device 102 may be configured to be housed in a case and/or mounted to a surface. In some non-limiting embodiments, user device 102 may include eye tracking device 104. For example, eye tracking device 104 may be part of user device 102. In some non-limiting embodiments, eye tracking device 104 may be configured to be affixed on and/or near user device 102. In some non-limiting embodiments, eye tracking device 104 may be a portable device. In some non-limiting embodiments, eye tracking device 104 may be configured for indoor and/or outdoor use.

In some non-limiting embodiments, eye tracking device 104 may include one or more devices capable of communicating information to and/or receiving information from user device 102 and/or user 106. For example, eye tracking device 104 may receive gaze data from user 106 and/or communicate the gaze data to user device 102. In some non-limiting embodiments or aspects, user device 102 and/or eye tracking device 104 may be calibrated for use by a specific user.

In some non-limiting embodiments or aspects, user 106 may communicate information to and/or receive information from user device 102 and/or eye tracking device 104. For example, user 106 may communicate (e.g., input) gaze data into eye tracking device 104 and/or user device 102. Additionally or alternatively, user 106 may input data into user device 102 via one or more peripherals of the user device (e.g., keyboard, mouse, audio device, camera, touchpad, etc.).

The number and arrangement of systems and/or devices shown in FIG. 1 are provided as an example. There may be additional systems and/or devices; fewer systems and/or devices; different systems and/or devices; and/or differently arranged systems and/or devices than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems (e.g., one or more systems) or a set of devices (e.g., one or more devices) of system 100 may perform one or more functions described as being performed by another set of systems or another set of devices of system 100.

Figure 2:
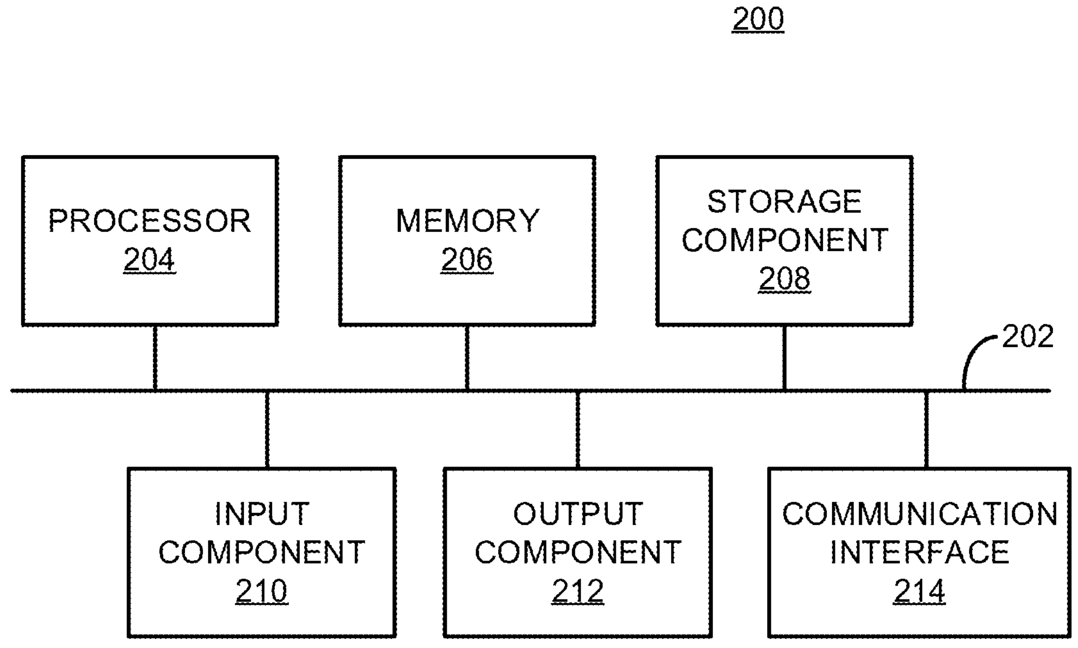
FIG. 2 is a diagram of example components of a device used in connection with non-limiting embodiments or aspects of the disclosed subject matter.

Referring now to FIG. 2, shown is a diagram of example components of a device 200 used in connection with non-limiting embodiments or aspects. Device 200 may correspond to user device 102 (e.g., one or more devices of user device 102) and/or eye tracking device 104 (e.g., one or more devices of eye tracking device 104). In some non-limiting embodiments or aspects, user device 102 and/or eye tracking device 104 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage memory (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3A:
FIG. 3A is a flow diagram of a process for drawing and fine-tuned motor controls according to non-limiting embodiments.
Figure 3A:
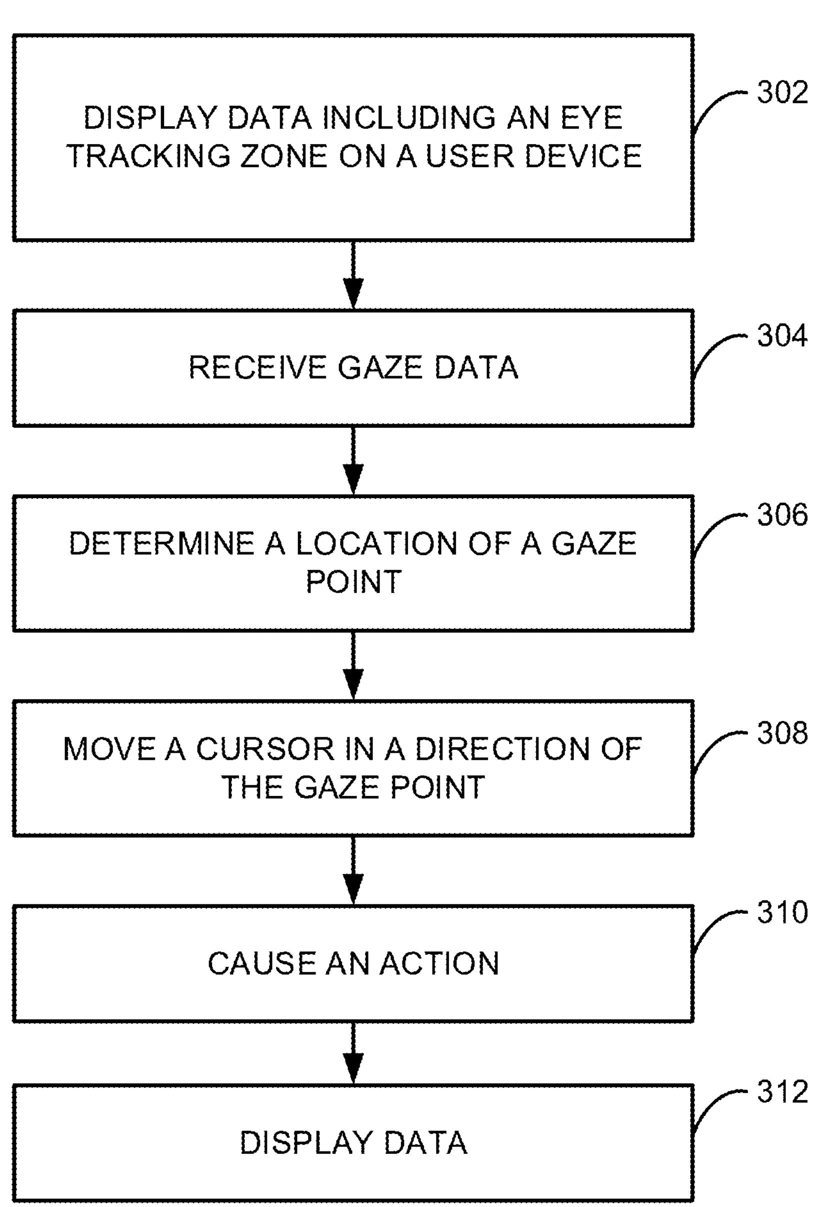

Referring now to FIG. 3A, shown is a flow diagram of a process 300 for drawing and fine-tuned motor controls according to non-limiting embodiments. In some non-limiting embodiments, one or more steps of process 300 may be executed by user device 102, eye tracking device 104, and/or user 106. Additionally or alternatively, one or more steps of process 300 may be executed (e.g., completely, partially, and/or the like) by another system, another device, another group of systems, or another group of devices, separate from or including user device 102, eye tracking device 104, and/or user 106.

As shown in FIG. 3A at step 302, process 300 may include displaying data including an eye tracking zone on a user device. For example, user device 102 may display data including an eye tracking zone via a display of user device 102. In some non-limiting embodiments, user device 102 may display data including the eye tracking zone via a GUI on a display of user device 102. For example, the eye tracking zone may be displayed over a software application (e.g., digital illustration application, image editing application, video editing application, and/or the like) being used by a user of user device 102. In some non-limiting embodiments, the eye tracking zone may include at least one selectable button which may be used to open a drawing mode over the application. In some non-limiting embodiments, the drawing mode may enable the user to draw and/or edit within the open application.

In some non-limiting embodiments, a size of the eye tracking zone may be equivalent to a size of the display of user device 102 and/or a percentage of a size (e.g., height, width, and/or area of the display) of the display of user device 102. In some non-limiting embodiments, the eye tracking zone may include an activation zone. For example, the activation zone may be an area of the eye tracking zone displayed on a display of user device 102. In some non-limiting embodiments, a size of the activation zone may be a percentage of the size of the eye tracking zone and/or a percentage of the size of the display of user device 102. For example, the size of the activation zone may be between 1% and 40% of the size of the display of user device 102.

In some non-limiting embodiments, the activation zone may include the area of a single shape (e.g., the space enclosed within a perimeter of the shape) with one or more sides. For example, the activation zone may include the area of a circle, oval, triangle, square, rectangle, pentagon, hexagon, etc. In some non-limiting embodiments, the activation zone may include an area between two shapes with any number of sides. For example, the activation zone may be an area between two concentric circles (e.g., an annulus of the two concentric circles). In some non-limiting embodiments, the activation zone may include two concentric circles, where an area of a first circle is smaller than an area of the second circle. In some non-limiting embodiments, the area of the first circle and/or the area of the second circle may be a first percentage and/or a second percentage of the size of the display of user device 102, respectively. For example, the area of the first circle may be 3% of the size of the display of user device 102 and/or the area of the second circle may be 40% of the size of the display of user device 102. In some non-limiting embodiments, the size of the activation zone may be calculated by subtracting the size of the area of the first circle from the size of the area of the second circle. For example, where the area of the first circle is 3% of the size of the display of user device 102 and the area of the second circle is 40% of the size of the display of user device 102, the activation zone may be 37% of the size of the display of user device 102.

In some non-limiting embodiments, the area of the first circle may include a dragging zone. For example, the center of the first circle may execute a drag action. In some non-limiting embodiments, the dragging zone may replace the cursor. For example, a central point within the dragging zone may replace the cursor.

In some non-limiting embodiments, an outer edge of the eye tracking zone and/or an outer edge of the activation zone may include an icon and/or selectable button. For example, the outer edge of the eye tracking zone and/or the outer edge of the activation zone may include an icon and/or selectable button that, when selected by the user, will close the activation zone and/or end a drawing mode. In some non-limiting embodiments, an outer edge of the second circle may include the icon and/or selectable button. In some non-limiting embodiments, user device 102 and/or eye tracking device 104 may receive gaze data indicating a user's selection of the icon and/or selectable button. In response to receiving the user's selection of the icon and/or selectable button, user device 102 and/or eye tracking device 104 may stop movement of the cursor, close the activation zone, causing the activation zone to disappear from the display of user device 102, and/or end the drawing mode.

As shown in FIG. 3A at step 304, process 300 may include receiving gaze data. For example, user device 102 and/or eye tracking device 104 may receive gaze data from user 106 via one or more sensors (e.g., image sensors). In some non-limiting embodiments, the gaze data may include eye image data. For example, the gaze data may include images of the user's eye(s). In some non-limiting embodiments, upon receiving the gaze data, user device 102 and/or eye tracking device 104 may process the gaze data. For example, eye tracking device 104 may filter, edit, or alter the gaze data using image processing techniques. In some non-limiting embodiments, eye tracking device 104 may transmit the gaze data to user device 102. In some non-limiting embodiments, user device 102 may receive the gaze data from eye tracking device 104 and/or process the gaze data. In some non-limiting embodiments, user device 102 may display data on a display of user device 102 based on receiving and/or processing the gaze data.

As shown in FIG. 3A at step 306, process 300 may include determining a location of a gaze point. For example, user device 102 and/or eye tracking device 104 may determine a location of a gaze point based on the gaze data. In some non-limiting embodiments, user device 102 and/or eye tracking device 104 may determine whether the location of the gaze point is within the activation zone. For example, user device 102 and/or eye tracking device 104 may determine the location of the gaze point is within the annulus of the activation zone. In some non-limiting embodiments, determining the location of the gaze point is within the activation zone may include determining a time the location of the gaze point is within the activation zone exceeds a threshold value. For example, when determining the location of the gaze point is within the activation zone, user device 102 and/or eye tracking device 104 may determine the time the location of the gaze point is within the activation zone exceeds the threshold value. The threshold value may be an adjustable value and/or a preset value.

As shown in FIG. 3A at step 308, process 300 may include moving a cursor in a direction of the gaze point. For example, user device 102 may control movement of a cursor and move the cursor in a direction of the gaze point (e.g., toward the gaze point) based on the location of the gaze point within the activation zone. In some non-limiting embodiments, the cursor may appear on a display of user device 102. In some non-limiting embodiments, moving the cursor in the direction of the gaze point may include determining a location of the cursor; determining a distance between the location of the gaze point and the location of the cursor; and/or moving the cursor in the direction of the gaze point. For example, when moving the cursor in the direction of the gaze point, user device 102 and/or eye tracking device 104 may determine a location of the cursor; determine a distance between the location of the gaze point and the location of the cursor; and/or move the cursor in the direction of the gaze point. In some non-limiting embodiments, user device 102 and/or eye tracking device 104 may move the cursor from a first location in the direction of the gaze point to a second location at a speed. In some non-limiting embodiments, the speed of the cursor movement may be based on a distance between the location of the gaze point and the first location of the cursor. In some non-limiting embodiments, user device 102 and/or eye tracking device 104 may stop movement of the cursor. For example, user device 102 and/or eye tracking device 104 may stop movement of the cursor based on the gaze data. In some non-limiting embodiments, user device 102 and/or eye tracking device 104 may stop the movement of the cursor when the location of the gaze point is not within the activation zone.

In some non-limiting embodiments, the activation zone may move across (e.g., in any direction) the display of user device 102. For example, the activation zone may move across the display of user device 102 based on the gaze data and/or the location of the gaze point.

As shown in FIG. 3A at step 310, process 300 may include causing an action. For example, user device 102 may cause an action to be performed based on the gaze data. In some non-limiting embodiments, in response to moving the cursor in a direction of the gaze point, user device 102 may cause an action, such as drawing a line, to be performed. For example, in response to moving the cursor in a direction of the gaze point, user device 102 may draw an image, edit a photo, edit a video, scrub a video, and/or the like. In some non-limiting embodiments, the action may be ending a prior action. For example, the action may be ending the action of drawing an image, editing a photo, editing a video, scrubbing a video, and/or the like.

As shown in FIG. 3A, a step 312, process 300 may include displaying data. For example, user device 102 may display data via a display of user device 102. In some non-limiting embodiments, the data may be associated with the action. In some non-limiting embodiments, the data may be displayed via an interactive GUI on a display of user device 102. In some non-limiting embodiments, the gaze data may be used to draw an image which may be displayed on the display of user device 102.

Figure 3B:
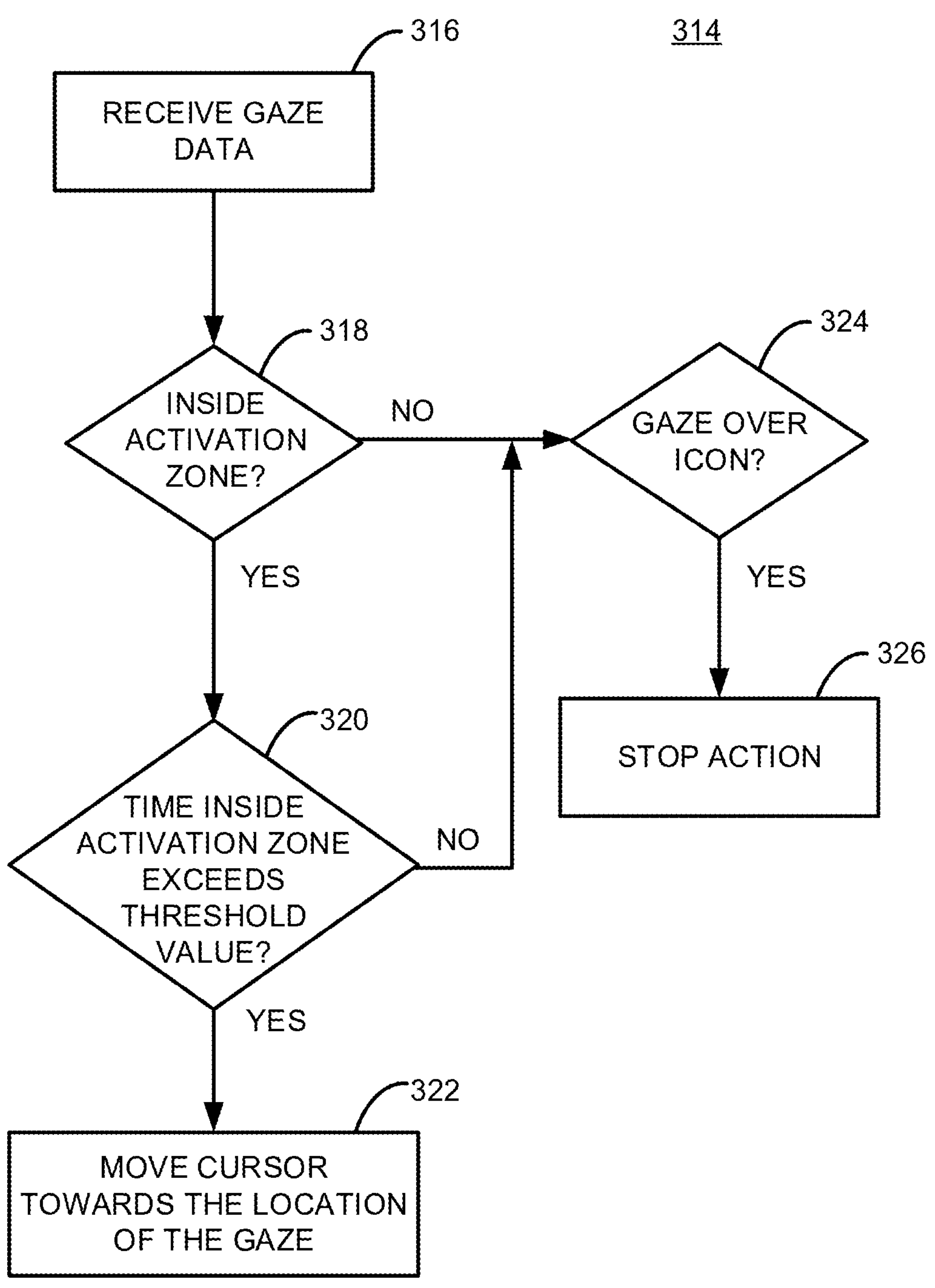
FIG. 3B is a flow diagram of a process for drawing and fine-tuned motor controls according to non-limiting embodiments.

Referring now to FIG. 3B is a flow diagram of a process 314 for drawing and fine-tuned motor controls according to non-limiting embodiments. In some non-limiting embodiments, one or more steps of process 314 may be executed by user device 102, eye tracking device 104, and/or user 106. Additionally or alternatively, one or more steps of process 314 may be executed (e.g., completely, partially, and/or the like) by another system, another device, another group of systems, or another group of devices, separate from or including user device 102, eye tracking device 104, and/or user 106.

As shown in FIG. 3B at step 316, process 314 may include receiving gaze data. For example user device 102 and/or eye tracking device 104 may receive gaze data from user 106, where the gaze data includes image data of the user's eye(s) including a location of the gaze point, where the location of the gaze point indicates a location where the user is looking on a display of user device 102.

As shown in FIG. 3B at step 318, process 314 may include determining whether the location of the gaze point is inside the activation zone. For example, user device 102 and/or eye tracking device 104 may determine whether the location of the gaze point is inside the activation based on the gaze data, where the activation zone includes two concentric circles, and where the location of the gaze point is within the annulus of the two concentric circles. In some non-limiting embodiments, if the location of the gaze point is within the activation zone, the process will proceed to step 320. Alternatively, if the location of the gaze point is not within the activation zone, the process will process to step 324.

As shown in FIG. 3B at step 320, process 314 may include determining whether the time the location of the gaze point is within the activation zone exceeds the threshold value. For example, after determining the location of the gaze point is within the activation zone, user device 102 and/or eye tracking device 104 may determine the location of the gaze point is within the activation zone for a time exceeding a preset threshold value. In some non-limiting embodiments, if user device 102 and/or eye tracking device 104 determines the time the location of the gaze point is within the activation zone exceeds the threshold value, process 314 will proceed to step 322. Alternatively, if user device 102 and/or eye tracking device 104 determines the time the location of the gaze point is within the activation zone does not exceed the threshold value, process 314 will proceed to step 324.

The number and arrangement of steps in FIG. 3A is provided as an example. In some non-limiting embodiments, process 300 may include additional steps, fewer steps, different steps, or differently arranged steps than those shown in FIG. 3A.

As shown in FIG. 3B at step 322, process 314 may include moving the cursor towards the location of the gaze. For example, after determining the time the location of the gaze point is within the activation zone exceeds the threshold value, user device 102 and/or eye tracking device 104 may move the cursor towards the location of the gaze point. In some non-limiting embodiments, when moving the cursor towards the location of the gaze point, the activation zone may move with the cursor. For example, when moving the cursor towards the location of the gaze point, the activation zone may move with the cursor where the cursor remains at the central point of the dragging zone.

As shown in FIG. 3B at step 324, process 314 may include determining the location of the gaze point is over the icon and/or selectable button. For example, after determining the location of the gaze point is not within the activation zone and/or after determining the time the gaze point is located within the activation zone does not exceed the threshold value, user device 102 and/or eye tracking device 104 may determine whether the location of the gaze point is over the icon and/or selectable button located on the outer edge of the activation zone. In some non-limiting embodiments, if user device 102 and/or eye tracking device 104 determines the location of the gaze point is over the icon and/or selectable button, process 314 may proceed to step 326.

In some non-limiting embodiments, when determining whether the location of the gaze point is over the icon and/or selectable button, user device 102 and/or eye tracking device 104 may determine whether a time the location of the gaze point is over the icon and/or selectable button exceeds a second threshold value.

As shown in FIG. 3B at step 326, process 314 may include stopping an action. For example, if user device 102 and/or eye tracking device 104 determine the location of the gaze point is over the icon and/or selectable button located at the edge of the activation zone, user device 102 and/or eye tracking device 104 may stop an action (e.g., drawing, editing an image, editing a video, scrubbing a video, etc.).

The number and arrangement of steps in FIG. 3B are provided as an example. In some non-limiting embodiments, process 314 may include additional steps, fewer steps, different steps, or differently arranged steps than those shown in FIG. 3B.

FIGS. 4A-4H are an exemplary implementation of the processes shown in FIGS. 3A and 3B according to non-limiting embodiments. As shown in FIGS. 4A-4H, implementation 400 may include user device 402, eye tracking device 404, user 406, activation zone 408, gaze point 410, first circle 412, second circle 414, cursor locations 416, 418, 420, 422, icon 424, and/or eye tracking zone 426. In some non-limiting embodiments, user device 402 may be the same as, similar to, and/or part of user device 102. In some non-limiting embodiments, eye tracking device 104 may be the same as, similar to, and/or part of eye tracking device 104. In some non-limiting embodiments, user 406 may be the same as and/or similar to user 106.

In some non-limiting embodiments or aspects, user 406 may calibrate user device 402 and/or eye tracking device 404 to capture eye image data and allow the user to communicate with user device 402 via eye gaze control. After calibrating user device 402 and/or eye tracking device 404, the user may use eye gaze control to communicate with user device 402. In some non-limiting embodiments, user device 402 may display eye tracking zone 426 via a display of user device 402. The size of eye tracking zone 426 may be smaller or equivalent to the size of the display of user device 402. For example, the size of eye tracking zone 426 may be a percentage (e.g., 40%-100%) of the display of user device 402. In some non-limiting embodiments, the size of eye tracking zone 426 may be based on a user's calibration of user device 402 and/or eye tracking device 404.

In some non-limiting embodiments or aspects, user 406 may open an application (e.g., a drawing or editing software application, such as Microsoft Paint) on user device 402. Upon opening the application, user 406 may select to open a drawing mode over the application using at least one selectable icon. The drawing mode may enable user 406 to obtain fine-tuned control of the cursor to create a drawing and/or edit an image within the open application. For example, user device 402 may display a plurality of selectable icons via an interactive GUI on user device 402, where the plurality of icons may include at least a drawing mode icon. Using eye gaze control, the user may select the drawing mode icon and open a drawing mode within eye tracking zone 426. In some non-limiting embodiments, the interactive GUI may update the plurality of selectable icons based on a first selection from user 406. For example, after a selection of the drawing mode icon by user 406, the interactive GUI may update to include a hide the guide icon, an adjust target icon, a draw line icon, an undo icon, a redo icon, and/or a close icon.

In some non-limiting embodiments, eye tracking zone 426 may include activation zone 408 and/or icon 424. In some non-limiting embodiments, upon selecting the drawing mode icon and opening the drawing mode over the application, activation zone 408 may appear via an interactive GUI on the display of user device 402.

In some non-limiting embodiments, drawing mode may include one or more drawing tools which may be chosen by user 406 based on selecting a respective selectable icon. For example, upon selecting drawing mode, the interactive GUI may update to include a selectable icon for a trace tool, an adjust target tool, and/or a draw line. In some non-limiting embodiments, upon selecting the trace tool icon, the trace tool may follow the user's gaze and provide feedback about the location of the gaze point on the screen. In some non-limiting embodiments, upon selecting the adjust target tool icon, the adjust target tool may allow the user to redefine the gaze point in a zoomed and centered window appearing on the display of user device 402, giving the user more control of a starting point of a drawing and/or line. In some non-limiting embodiments, upon selecting the draw line tool icon, the draw line tool may display activation zone 408.

In some non-limiting embodiments, activation zone 408 may include first circle 412 and/or second circle 414. In some non-limiting embodiments, first circle 412 may appear inside of second circle 414. For example, first circle 412 and second circle 414 may be concentric circles, where a diameter of first circle 412 is smaller than a diameter of second circle 414. In some non-limiting embodiments, the activation zone may include the annulus between the two concentric circles 412, 414. In some non-limiting embodiments, any part of the display outside of the perimeter of second circle 414 may be outside of the activation zone. Additionally or alternatively, any part of the display inside the perimeter of first circle 412 may be outside of the activation zone.

In some non-limiting embodiments, activation zone 408 may take the place of a cursor on the display of user device 402. For example, activation zone 408 may move about the display of user device 402 in place of a cursor pointer. In some non-limiting embodiments, a cursor pointer may appear outside of the activation zone and/or inside of the activation zone. For example, a cursor pointer may appear outside of the activation zone, at the center of first circle 412.

In some non-limiting embodiments, activation zone 408 may be used on top of software applications (e.g., digital illustration applications, image editing applications, video editing applications, and/or the like). For example, activation zone 408 may appear over a digital illustration software (e.g., Microsoft Paint) being run on user device 402, where activation zone 408 takes the place of the cursor on the display of user device 402.

In some non-limiting embodiments, user device 402 and/or eye tracking device 404 may receive gaze data from user 406. For example, user 406 may look at or near user device 402 and/or eye tracking device 404 and eye tracking device 404 may receive, collect, process, and/or store the user's gaze data. In some non-limiting embodiments, eye tracking device 404 may transmit (via a wireless and/or a wired connection) the gaze data to user device 402. For example, eye tracking device 404 may receive gaze data from a user and provide the gaze data to user device 402 via a connection between the two devices. In some non-limiting embodiments, user device 402 may receive gaze data directly from user 406.

The gaze data may include image data (e.g., eye images), gaze point data (e.g., location of a gaze point, time a gaze point is in a location, etc.), and/or the like. In some non-limiting embodiments, user device 102 and/or eye tracking device 104 may determine a location of gaze point 410 based on the gaze data. For example, user device 402 and/or eye tracking device 404 may determine the location of gaze point 410 is within activation zone 408. For example, user device 402 and/or eye tracking device 404 may determine the location of gaze point 410 is within activation zone 408 if gaze point 410 is in an area between first circle 412 and second circle 414. In some non-limiting embodiments, determining the location of gaze point 410 is within the activation zone may include determining the time the location of gaze point 410 is within the activation zone exceeds the threshold value.

In some non-limiting embodiments, user device 402 and/or eye tracking device 404 may move cursor 416 in a direction of gaze point 410. For example, as shown in FIGS. 4B-4G, user device 402 and/or eye tracking device 404 may move the cursor in a direction A, B, and/or C of gaze point 410 based on the gaze data (e.g., a location of the gaze point). The cursor may be moved from a first cursor location 416 in a direction, A, to a second cursor location 418. The cursor may be moved from the second cursor location 418 in a direction, B, to a third cursor location 420. The cursor may be moved from the third cursor location 420 in a direction, C, to a fourth cursor location 422. In some non-limiting embodiments, moving the cursor 416 in the direction, A, of gaze point 410 may include determining a location of the cursor (e.g., a cursor location).

In some non-limiting embodiments, user 406 may interact with user device 402 and/or eye tracking device 404 and control the movement of the cursor appearing on the display of user device 402 by changing a parameter of a plurality of parameters. The plurality of parameters may include at least a direction of cursor movement and a speed of cursor movement.

In some non-limiting embodiments, the direction of the cursor may be determined by moving the cursor toward gaze point 410. In some non-limiting embodiments, a cursor location may be determined based on the following equation, where $M_{new}$ is the second cursor location (e.g., new cursor location), $M_{old}$ is the first cursor location (e.g., old cursor location), and where $\vec{m}_{mouse}$ is a vector describing the movement of the cursor:

$$M_{new} = M_{old} + \vec{m}_{mouse}$$

In some non-limiting embodiments, the movement of the cursor, $\vec{m}_{mouse}$, may be defined by:

$$\vec{m}_{mouse} = \hat{d} * (s * (S_{max} - S_{min}) + S_{min})$$

In some non-limiting embodiments, the speed of the cursor movement may be determined based on a distance between the cursor and gaze point 410. In some non-limiting embodiments, $S_{max}$ and $S_{min}$ may describe a maximum speed and a minimum speed of the cursor movement, respectively. In some non-limiting embodiments, a value of $S_{max}$ and/or $S_{min}$ may be a constant value. In some non-limiting embodiments, a speed of $S_{max}$ and/or $S_{min}$ may be measured using a relative speed unit. For example, a speed for $S_{max}$ and/or $S_{min}$ may be measured by a speed per move (spm). In some non-limiting embodiments, $S_{max}$ may have a value of 150 spm. In some non-limiting embodiments $S_{min}$ may have a value of 20 spm.

In some non-limiting embodiments, moving the cursor 416 in the direction, A, of gaze point 410 may include determining a distance between the location of the gaze point and the location of the cursor. In some non-limiting embodiments, $\hat{d}$ may be a normalized vector of $\vec{d}$, where $\vec{d}$ is a vector from a cursor location, $m_p$, to a gaze location, $g_p$. In some non-limiting embodiments, $\vec{d}$ may be defined by:

$$\vec{d} = g_p - m_p$$

In some non-limiting embodiments, moving the cursor 416 in the direction, A, of gaze point 410 may include moving the cursor in the direction of the gaze point at a speed, wherein the speed of the cursor movement is based on the distance between the location of the gaze point and the first location of the cursor. In some non-limiting embodiments, s may be a speed of a cursor movement at a given time based on the following, where $|d|$ is a length of vector $\vec{d}$, and where $D_{min}$ and $D_{max}$ are each a distance between $m_p$ and $g_p$:

$$s = \frac{|d| - D_{min}}{D_{max} - D_{min}}$$

In some non-limiting embodiments, the s may be a factor between 1 and 0.

In some non-limiting embodiments, $D_{min}$ may be a minimum distance between $m_p$ and $g_p$ required for cursor movement and/or $D_{max}$ may be a maximum distance between $m_p$ and $g_p$ allowed before the cursor movement will stop. For example, cursor movement may be based on the following:

$$\begin{cases} \text{if } |d| < D_{min}, & \text{then cursor does not move} \\ \text{if } D_{min} \le |d| \le D_{max}, & \text{then cursor moves} \\ \text{if } |d| > D_{max}, & \text{then cursor does not move} \end{cases}$$

Figure 4A:
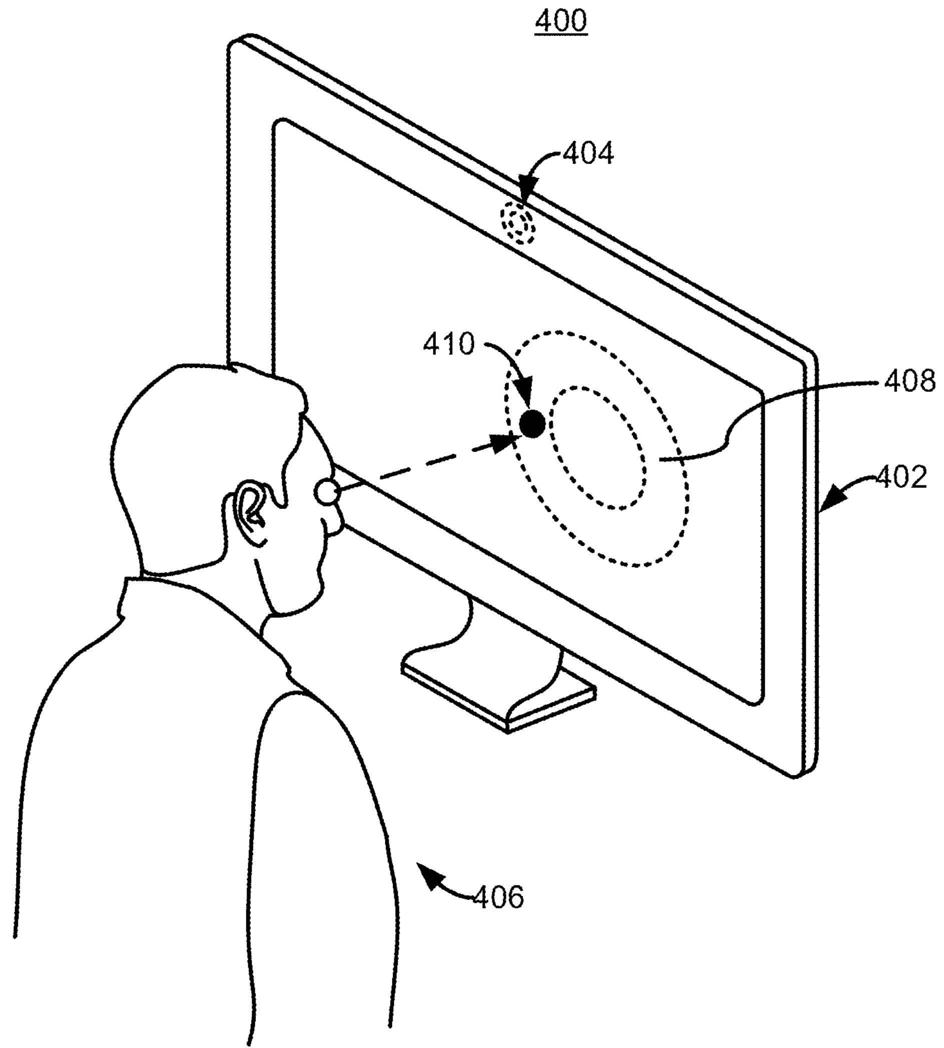
FIGS. 4A-4H are an exemplary implementation of the processes shown in FIGS. 3A and 3B according to non-limiting embodiments.
Figure 4B:
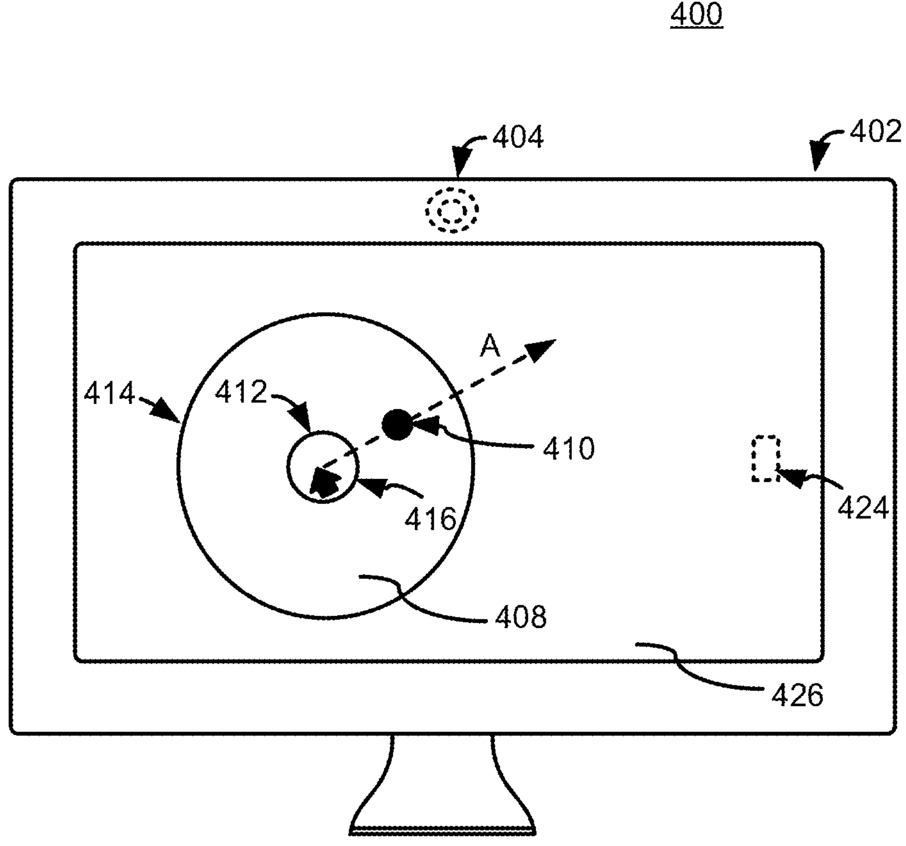
Figure 4C:
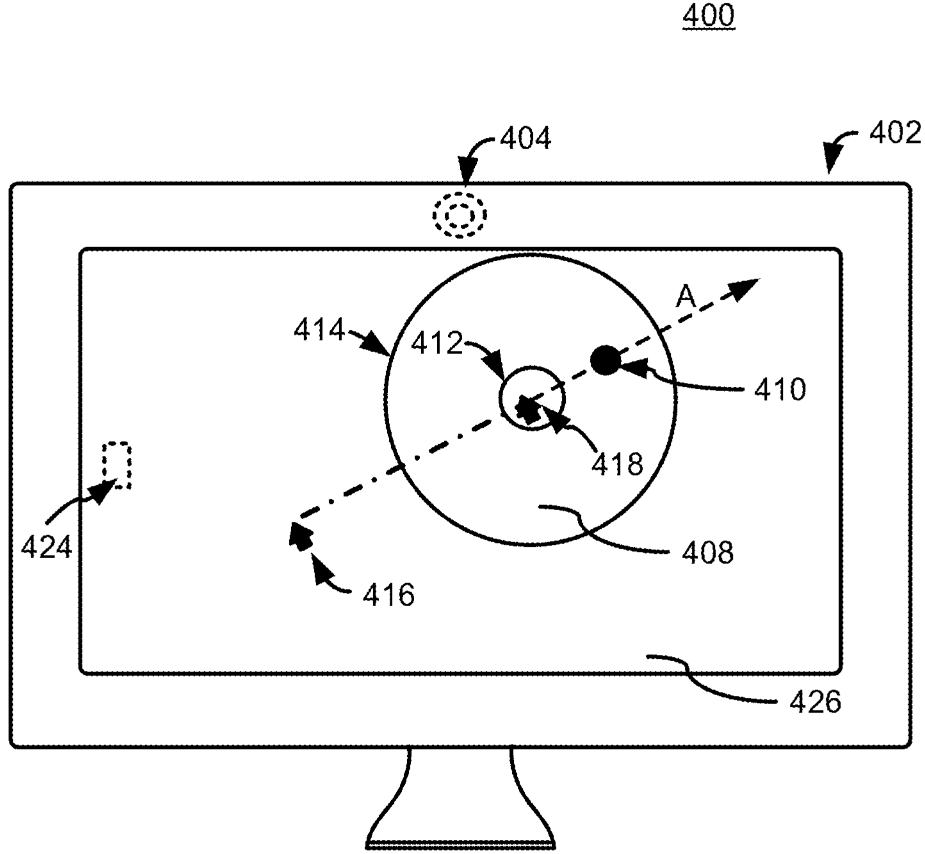
Figure 4D:
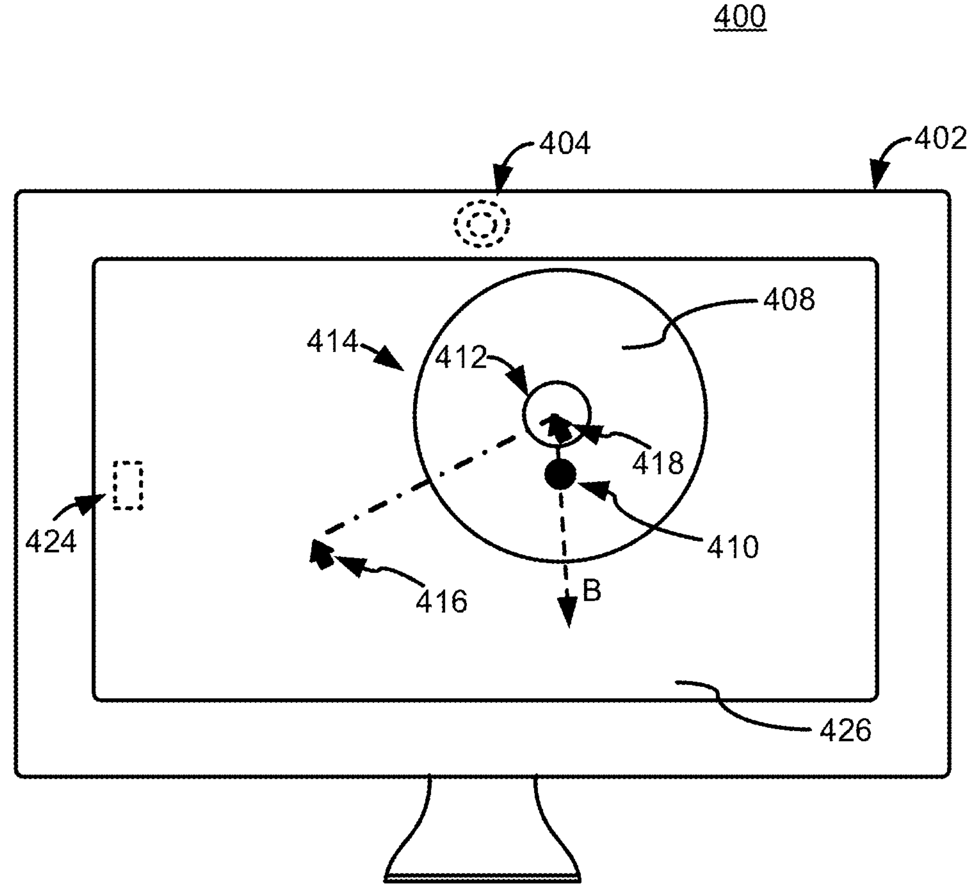

As shown in FIGS. 4B-4C, in response to moving the cursor in a direction (e.g., A, B, C) of the gaze point, an action may be performed. For example, in drawing mode, moving the cursor from first cursor location 416 to second cursor location 418 may cause a line to be drawn between first cursor location 416 and second cursor location 418, second cursor location 418 and third cursor location 420, and/or third cursor location 420 and fourth cursor location 422.

Figure 4E:
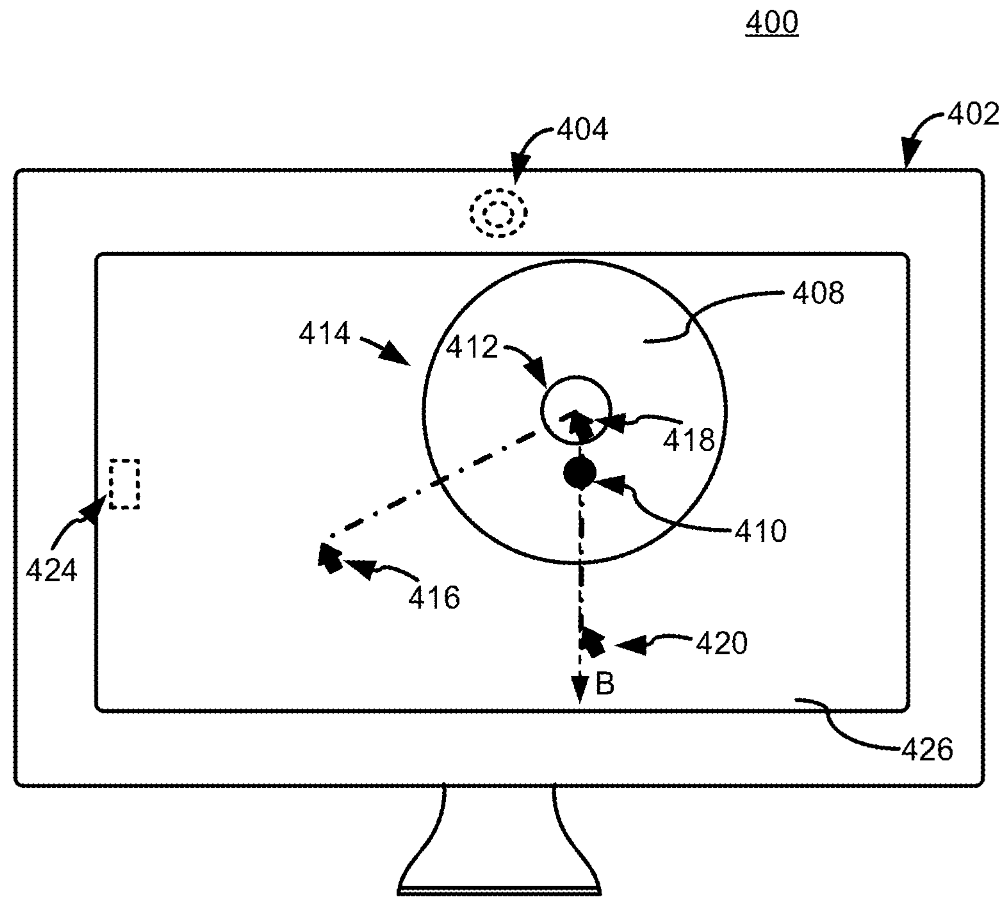
Figure 4F:
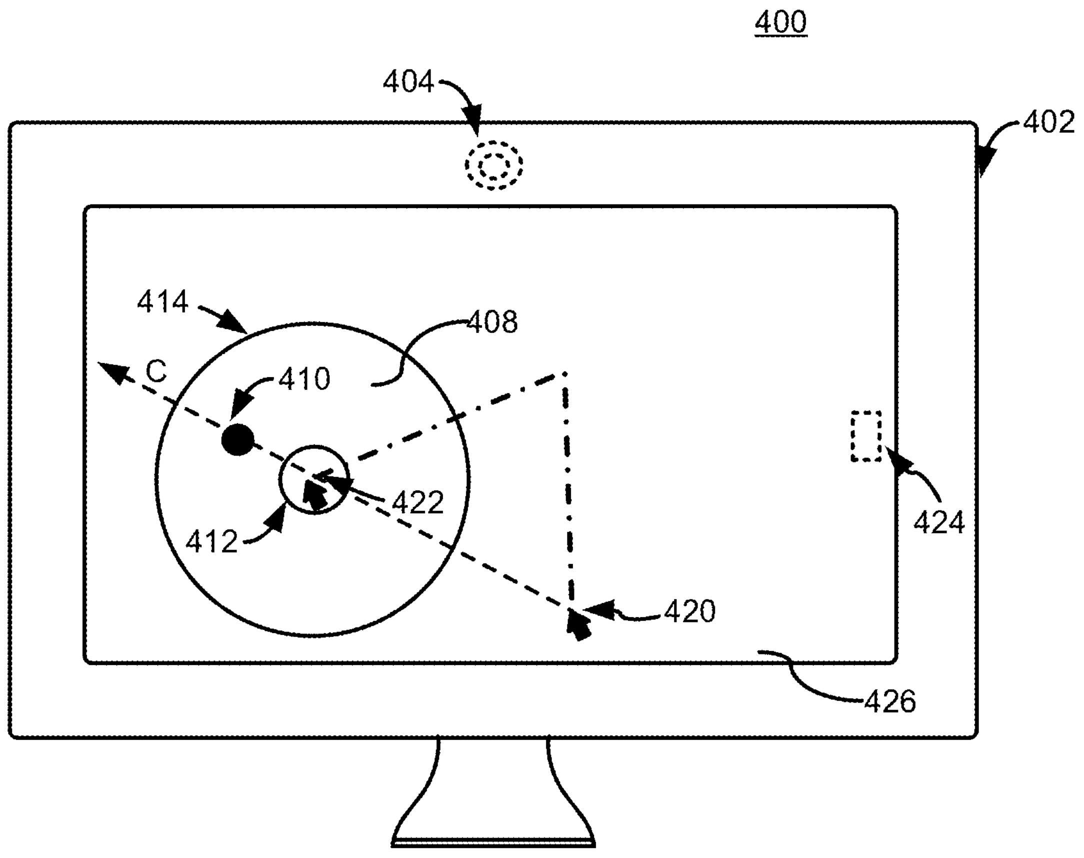
Figure 4G:
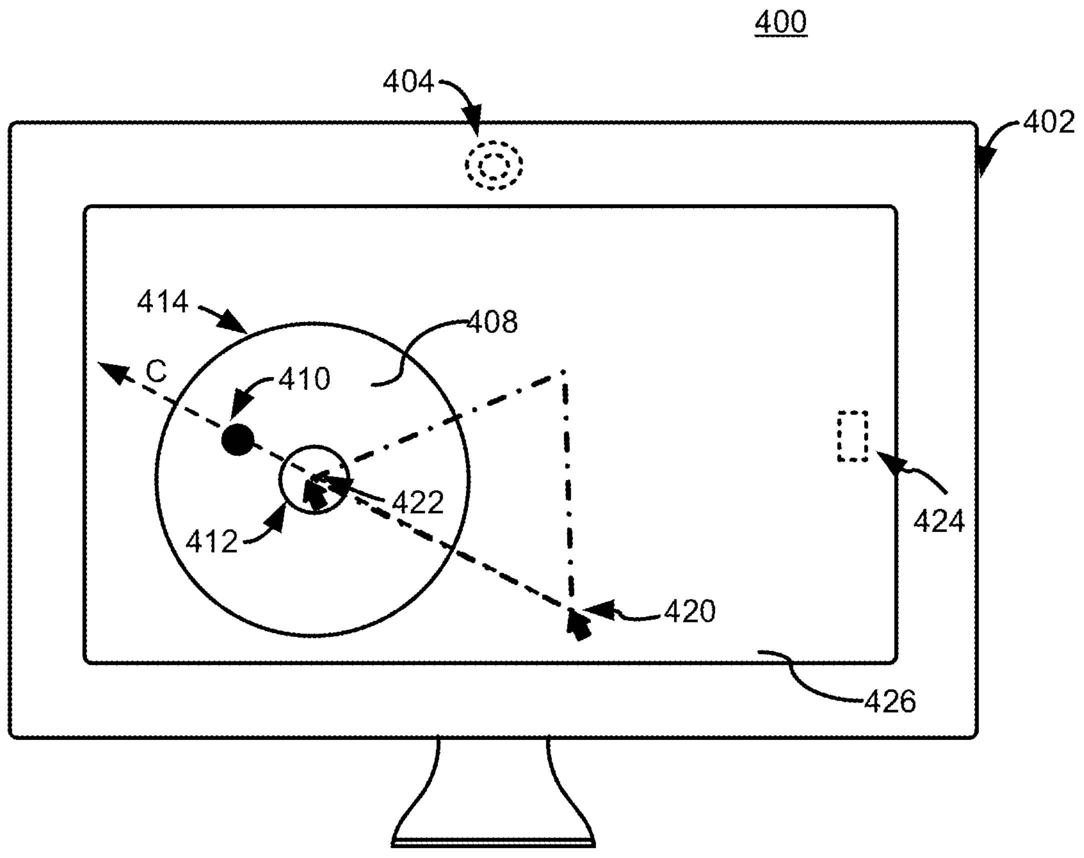

A shown in FIGS. 4C, 4E, and 4G, an action (e.g., drawing a line) may be performed in response to moving the cursor from a first cursor location to a second cursor location. In some non-limiting embodiments, data associated with the action may be displayed via the display of user device 402.

Figure 4H:
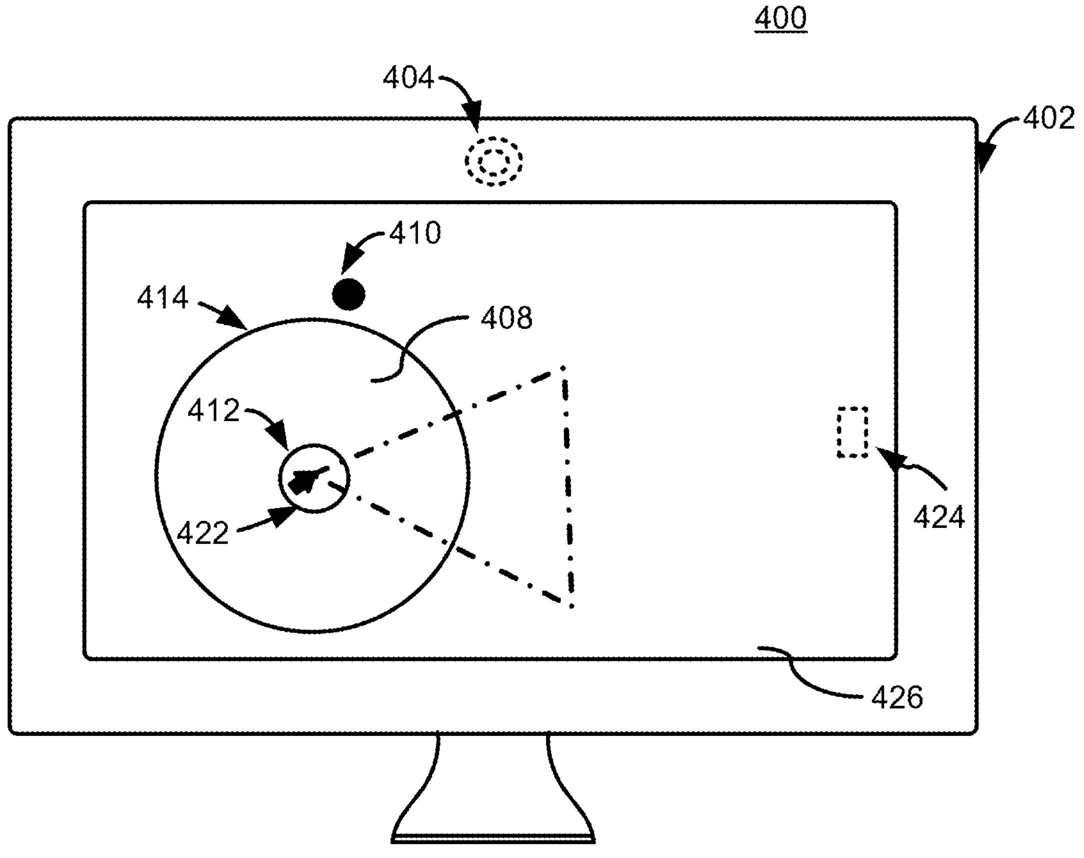

As shown in FIG. 4H, if the gaze point 410 is outside of the activation zone 408, the cursor movement may stop. For example, if the gaze point 410 is not between first circle 412 and second circle 414, the movement of the cursor may stop. In some non-limiting embodiments, stopping movement of the cursor may cause the action (e.g., drawing) to end. In some non-limiting embodiments, eye tracking zone 426 may include an icon at an edge of eye tracking zone 426. For example, eye tracking zone 426 may include an icon 424 at an edge of the display of user device 402. In some non-limiting embodiments or aspects, icon 424 may appear within eye tracking zone 426 on a side opposite of activation zone 408. In some non-limiting embodiments or aspects, icon 424 may be a selectable icon. For example, icon 424 may be selected by user 406 to end the drawing mode. In some non-limiting embodiments, user device 402 and/or eye tracking device 404 may receive a selection of the icon from user 406. User 406 may select the icon 424 by focusing the location of the gaze point 410 over the icon. In some non-limiting embodiments, user device 402 and/or eye tracking device 404 may stop the movement of the cursor based on receiving the selection of the icon 424 from user 406.

Although embodiments have been described in detail for the purpose of illustration, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A method comprising:

receiving, with at least one processor, gaze data from a user comprising a gaze point;

determining, with at least one processor, a location of the gaze point is within an activation zone displayed via a display of a user device, wherein the activation zone comprises an annulus between two concentric circles, wherein a first circle of the two concentric circles is an inner circle with a first perimeter, wherein a second circle of the two concentric circles is an outer circle with a second perimeter, wherein any part of the display of the user device inside of the perimeter of the first circle is outside of the activation zone, and wherein any part of the display of the user device outside of the perimeter of the second circle is outside of the activation zone;

moving, with at least one processor, a cursor and the activation zone across the display of the user device in a direction of the gaze point based on determining the location of the gaze point is within the activation zone;

in response to moving the cursor and the activation zone in a direction of the gaze point, causing, with at least one processor, an action to be performed;

displaying, with at least one processor, data associated with the action via the display of the user device; and stopping, with at least one processor, movement of the cursor based on determining the location of the gaze point is outside the activation zone, wherein stopping movement of the cursor causes the action to end.

2. The method of claim 1, wherein determining the location of the gaze point is within the activation zone comprises:

determining a time the location of the gaze point is within the activation zone satisfies a threshold value; and determining the location of the gaze point is within the activation zone based on determining the time the location of the gaze point is within the activation zone satisfies the threshold value.

3. The method of claim 1, wherein an outer edge of the activation zone comprises an icon, the method further comprising:

receiving a selection of the icon by the user; and stopping movement of the cursor based on receiving the selection of the icon by the user.

4. The method of claim 1, wherein a size of the activation zone is based on a percentage of a width of a display of the user device.

5. A system comprising:

at least one processor, the at least one processor programmed or configured to:

receive, with at least one processor, gaze data from a user comprising a gaze point;

determine a location of the gaze point is within an activation zone displayed via a display of a user device, wherein the activation zone comprises an annulus between two concentric circles, wherein a first circle of the two concentric circles is an inner circle with a first perimeter, wherein a second circle of the two concentric circles is an outer circle with a second perimeter, wherein any part of the display of the user device inside of the perimeter of the first circle is outside of the activation zone, and wherein any part of the display of the user device outside of the perimeter of the second circle is outside of the activation zone;

move a cursor and the activation zone across the display of the user device in a direction of the gaze point based on determining the location of the gaze point is within the activation zone;

in response to moving the cursor and the activation zone in a direction of the gaze point, cause an action to be performed;

display data associated with the action via the display of the user device; and stop movement of the cursor based on determining the location of the gaze point is outside the activation zone, wherein stopping movement of the cursor causes the action to end.

6. The system of claim 5, wherein, when determining the location of the gaze point is within the activation zone, the at least one processor is programmed or configured to:

determine a time the location of the gaze point is within the activation zone satisfies a threshold value; and determine the location of the gaze point is within the activation zone based on determining the time the location of the gaze point is within the activation zone satisfies the threshold value.

7. The system of claim 5, wherein an outer edge of the activation zone comprises an icon, and wherein the at least one processor is further programmed or configured to:

receive a selection of the icon by the user; and stop movement of the cursor based on receiving the selection of the icon by the user.

8. The system of claim 5, wherein a size of the activation zone is based on a percentage of a width of a display of the user device.

9. A computer program product comprising at least one non-transitory computer-readable medium including one or more instructions that, when executed by at least one processor, cause the at least one processor to:

receive gaze data from a user comprising a gaze point;

determine a location of the gaze point is within an activation zone displayed via a display of a user device, wherein the activation zone comprises an annulus between two concentric circles, wherein a first circle of the two concentric circles is an inner circle with a first perimeter, wherein a second circle of the two concentric circles is an outer circle with a second perimeter, wherein any part of the display of the user device inside of the perimeter of the first circle is outside of the activation zone, and wherein any part of the display of the user device outside of the perimeter of the second circle is outside of the activation zone;

move a cursor and the activation zone across the display of the user device in a direction of the gaze point based on determining the location of the gaze point is within the activation zone;

in response to moving the cursor and the activation zone in a direction of the gaze point, cause an action to be performed;

display data associated with the action via the display of the user device; and stop movement of the cursor based on determining the location of the gaze point is outside the activation zone, wherein stopping movement of the cursor causes the action to end.

10. The computer program product of claim 9, wherein, when determining the location of the gaze point is within the activation zone, the instructions cause the at least one processor to:

determine a time the location of the gaze point is within the activation zone satisfies a threshold value; and determine the location of the gaze point is within the activation zone based on determining the time the location of the gaze point is within the activation zone satisfies the threshold value.

11. The computer program product of claim 9, wherein an outer edge of the activation zone comprises an icon, and wherein the instructions further cause the at least one processor to:

receive a selection of the icon by the user; and stop movement of the cursor based on receiving the selection of the icon by the user.

* * * * *